US008804576B2

(12) United States Patent
Fuse et al.

(10) Patent No.: US 8,804,576 B2
(45) Date of Patent: Aug. 12, 2014

(54) BROWSING MANAGEMENT APPARATUS, BROWSING MANAGEMENT METHOD, AND PROGRAM PRODUCT THEREOF

(75) Inventors: Tohru Fuse, Tokyo (JP); Zhihua Zhong, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 2028 days.

(21) Appl. No.: 11/589,930

(22) Filed: Oct. 31, 2006

(65) Prior Publication Data

US 2007/0286387 A1    Dec. 13, 2007

(30) Foreign Application Priority Data

Jun. 9, 2006  (JP) ................................ 2006-160360

(51) Int. Cl.
| | |
|---|---|
| H04L 12/16 | (2006.01) |
| H04Q 11/00 | (2006.01) |
| G06F 15/16 | (2006.01) |
| H04M 3/42 | (2006.01) |
| H04L 12/18 | (2006.01) |
| H04M 3/56 | (2006.01) |
| H04L 12/58 | (2006.01) |

(52) U.S. Cl.
CPC .......... *H04M 3/567* (2013.01); *H04M 2201/40* (2013.01); *H04M 3/42221* (2013.01); *H04L 12/1831* (2013.01); *H04L 12/58* (2013.01)
USPC ............................ 370/261; 370/260; 709/204

(58) Field of Classification Search
None
See application file for complete search history.

(56) References Cited

U.S. PATENT DOCUMENTS

| | | | |
|---|---|---|---|
| 2002/0091850 A1* | 7/2002 | Perholtz et al. ............... | 709/231 |
| 2004/0098456 A1* | 5/2004 | Krzyzanowski et al. ..... | 709/204 |
| 2004/0111644 A1* | 6/2004 | Saunders et al. ............. | 713/202 |
| 2004/0193683 A1* | 9/2004 | Blumofe ....................... | 709/204 |
| 2005/0190706 A1* | 9/2005 | Henderson et al. ........... | 370/260 |
| 2006/0050688 A1* | 3/2006 | Panagopoulos et al. ...... | 370/356 |
| 2006/0151607 A1 | 7/2006 | Horikiri et al. | |

FOREIGN PATENT DOCUMENTS

| | | |
|---|---|---|
| JP | A-2002-007343 | 1/2002 |
| JP | A 2002-049595 | 2/2002 |
| JP | A 2002-063290 | 2/2002 |
| JP | A-2002-132837 | 5/2002 |
| JP | A-2005-222089 | 8/2005 |
| JP | A-2006-127221 | 5/2006 |
| JP | A-2006-135671 | 5/2006 |
| JP | A-2006-146415 | 6/2006 |
| JP | A-2006-148730 | 6/2006 |

OTHER PUBLICATIONS

Japanese Office Action issued in Japanese Patent Application No. 2006-160360 dated Feb. 22, 2011 (with translation).

* cited by examiner

*Primary Examiner* — Faruk Hamza
*Assistant Examiner* — Thinh Tran
(74) *Attorney, Agent, or Firm* — Oliff PLC (57) ABSTRACT

A browsing management apparatus includes a location information generating portion that generates unique location information that includes a location of a content used in a conference and identification information identifying a participant of the conference, a transmitting portion that transmits the unique location information to the participant of the conference, and an identifying portion that receives an access designating the unique location information from a terminal device used by the participant of the conference and identifies the participant of the conference with the unique location information.

16 Claims, 9 Drawing Sheets

MINUTES

- CONFERENCE AGENDA: ABOUT NEW PRODUCT X

- DATE: MARCH 20, 2006

- PLACE: THIRD CONFERENCE ROOM

- PARTICIPANTS: GENERAL MANAGER A, ASSISTANCE GENERAL MANAGER B, etc.

- PROCEEDING SUMMARY: XXABCD/////

THUMBNAIL IMAGE
_________________________________________

1  PRESENTATION BY MR. TARO FUJI

2  RESULTS OF FISCAL 2005

.
.
.

FIG. 3A  CONTENT ID MANAGEMENT TABLE

| CONFERENCE SESSION ID | 3rg8ury0a | as4nbs8u | 3w0v5ft8 |
|---|---|---|---|
| CONTENT ID | 345567 | 985674 | 377788 |
| CONTENT ID | 010246 | 555532 | 298144 |
| CONTENT ID | 938271 | 852963 | 236514 |
| ⋮ | ⋮ | ⋮ | ⋮ |
| E-MAIL ADDRESS | ab@mdu.jp<br>mv@mdu.jp<br>⋮ | rvb@mdu.jp<br>st@mdu.jp<br>⋮ | |

FIG. 3B  ACCESS CONTROL MANAGEMENT TABLE

| LOGIN ID | 3rg8ury0a | as4nbs8u | 3w0v5ft8 |
|---|---|---|---|
| ACCESS ID | r5uwpl10a | 2r4rt0su | 5ry7c08nbz |
| CONFERENCE SESSION ID | abc-236 | stu-20 | xyz-36 |

FIG. 3C  USER PROFILE MANAGEMENT TABLE

| LOGIN ID | 3rg8ury0a | as4nbs8u | 3w0v5ft8 |
|---|---|---|---|
| PASSWORD | 345567 | 985674 | 938271 |
| E-MAIL ADDRESS | 012@mdu.jp | mv@mdu.jp | ..... |

FIG. 3D  SESSION MANAGEMENT TABLE

| ACCESS ID | 3rg8ury0a | as4nbs8u | 3w0v5ft8 |
|---|---|---|---|
| LAST ACCESSED TIME | 05_12_4<br>22:13 | 06_3_11<br>11:50 | 06_4_5<br>15:04 |
| TERMINAL IDENTIFICATION ID | XriD4hH | Hgr57Ks | g5eImh |

MINUTES

- CONFERENCE AGENDA: NEW PRODUCT X

- DATE: MARCH 20, 2006

- PLACE: THIRD CONFERENCE ROOM

- PARTICIPANTS: GENERAL MANAGER A, ASSISTANCE GENERAL MANAGER B, etc.

- PROCEEDING SUMMARY: XXABCD/////

1 PRESENTATION BY MR. TARO FUJI

2 RESULTS OF FISCAL 2005

.
.
.

ABROWSING MANAGEMENT APPARATUS, BROWSING MANAGEMENT METHOD, AND PROGRAM PRODUCT THEREOF

BACKGROUND

1. Technical Field

This invention relates to a technology for quickly distributing data obtained by capturing materials used in a conference or a meeting and sound data obtained by recording statements in the conference via a network.

2. Related Art

In a network conference system used for a conference via a network, the proceeding can be progressed synchronously among remote locations as follows. That is, an image/sound input device such as a camera and a microphone and an image/sound output device such as a monitor and a speaker are set up in multiple conference rooms located remotely. By using communication lines, it is possible to share events such as statements and questions and answers in the respective conference rooms.

SUMMARY

An aspect of the present invention provides a browsing management apparatus including: a location information generating portion that generates unique location information that includes a location of a content used in a conference and identification information identifying a participant of the conference; a transmitting portion that transmits the unique location information to the participant of the conference; and an identifying portion that receives an access designating the unique location information from a terminal device used by the participant of the conference and identifies the participant of the conference with the unique location information.

BRIEF DESCRIPTION OF THE DRAWINGS

Embodiments of the present invention will be described in detail based on the following figures, wherein.

DETAILED DESCRIPTION

A description will now be given, with reference to the accompanying drawings, of exemplary embodiments of the present invention.

Exemplary Embodiments

Figure 1:
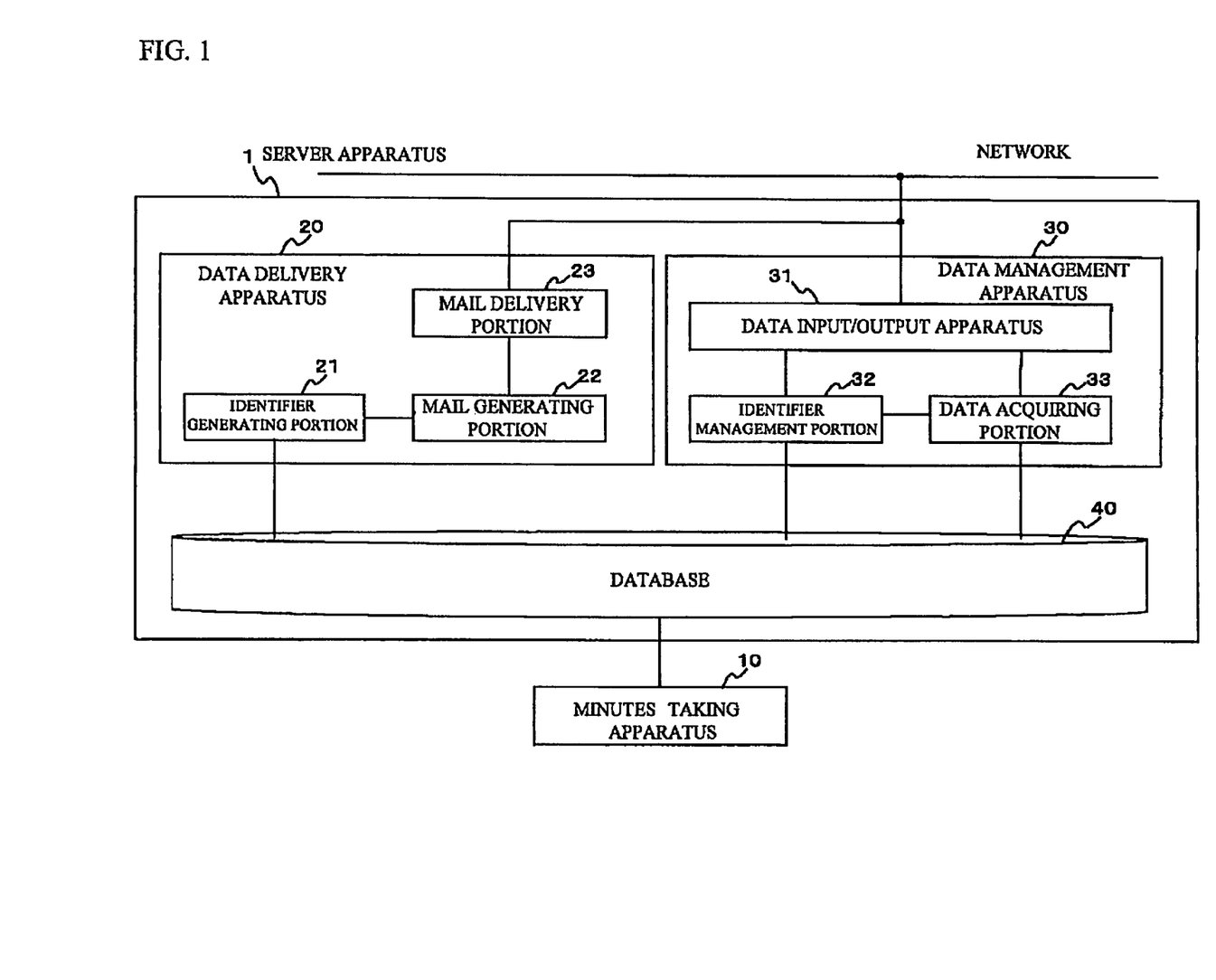
FIG. 1 is a diagram showing a structure of a server apparatus.

FIG. 1 shows a structure of this exemplary embodiment. This exemplary embodiment has a server apparatus 1 connected to a network and a minutes taking apparatus 10 serving as a management portion according to an aspect of the invention. The server apparatus 1 has: a data delivering apparatus 20; a data management apparatus 30; and a database 40.

The minutes taking apparatus 10 issues a conference session ID for every conference. For every conference session ID, the minutes taking apparatus 10 registers basic information such as an agenda, date, place, participant, and a proceeding summary of a conference, data of a material displayed by a projector or the like during the conference, writing data of the material, and sound data obtained by recording a statement in the conference in association with each other. The foregoing data will be hereinafter referred to as conference content. The basic information is input by a user's operation through an operation panel, not shown.

Figure 3A:
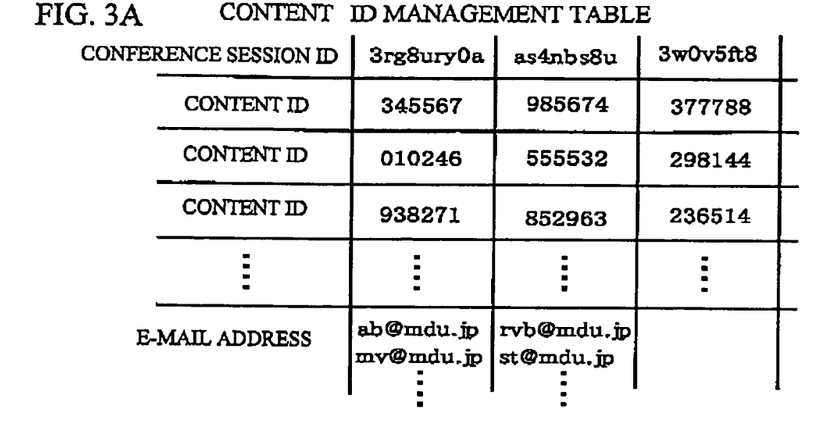
FIGS. 3A, 3B, 3C, and 3D are diagrams showing structures of management tables configured in a database.

FIG. 3A shows an example of a content ID management table that manages contents for every conference. The content ID management table is created in the database 40 by the minutes taking apparatus 10. In the management table, the material data used in the conference and the sound data are provided with content IDs, and the content IDs are registered in association with the conference session ID issued for every conference. An e-mail address of a conference participant is also registered in association with the conference session ID.

Figure 2:
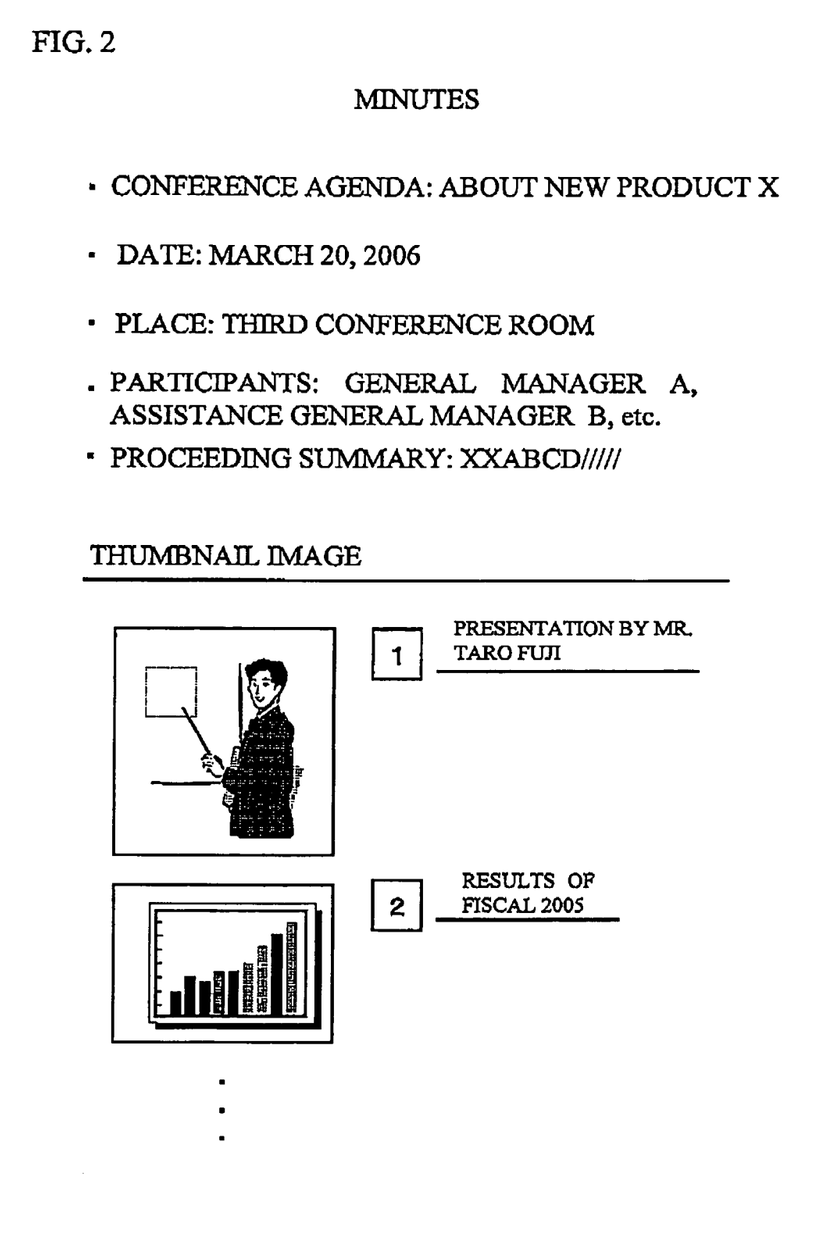
FIG. 2 is a view showing an example of minutes data.

When the minutes taking apparatus 10 registers the conference contents in the database 40, the minutes taking apparatus 10 creates minutes data as shown in FIG. 2. The minutes data gives a conference summary. The conference material data or the sound data cannot be viewed or listened through the minutes data. The minutes data shows the basic information such as an agenda, date, place, participant, and proceeding summary of the conference, thumbnail image partially showing the conference material, and caption that explains what type of material the thumbnail image is. Such created minutes data is stored in the database 40.

The data delivery apparatus 20 includes: an identifier generating portion 21; a mail generating portion 22; and a mail delivery portion 23.

Figure 3B:
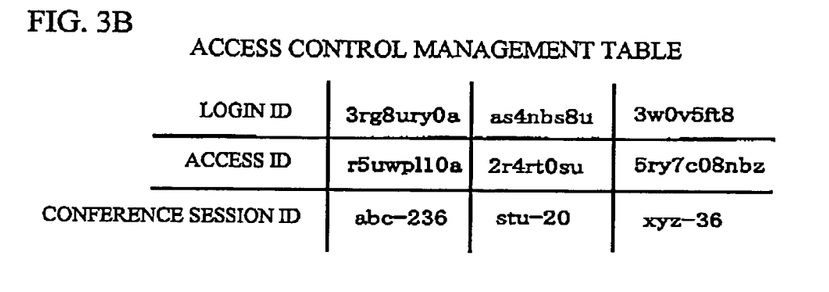

The identifier generating portion serving as a location information generating portion 21 according to an aspect of the invention generates a unique access ID, and sends the unique access ID to the mail generating portion 22. Such generated access ID is registered in an access control management table of the database 40. FIG. 3B shows an example of the access control management table that manages an access from a user. In the access control management table, the access ID generated by the identifier generating portion 21 is registered in association with a login ID and the conference session ID. The login ID is an ID to log in a system provided by the server apparatus 1, and is set for every user authorized to use the system.

The mail generating portion 22 serving as a mail creating portion of an aspect of the invention extracts the minutes data created by the minutes taking apparatus 10 from the database 40, and creates an e-mail with the minutes data as a body text. The minutes data is attached with a link, and thus an access to the server apparatus 1 is available when connected to the network. The access ID generated by the identifier generating portion 21 is included in a URL as a link destination attached to the minutes data. That is, by including the access ID serving as identification information according to an aspect of the invention in a URL indicating a location of the conference content (first location information), a URL different for every user (second location information) is generated. Therefore, the URL as a link destination is set different for every user.

The mail delivery portion 23 transmits the e-mail generated by the mail generating portion 22 to a receiver set as a destination of the e-mail.

Figure 10:
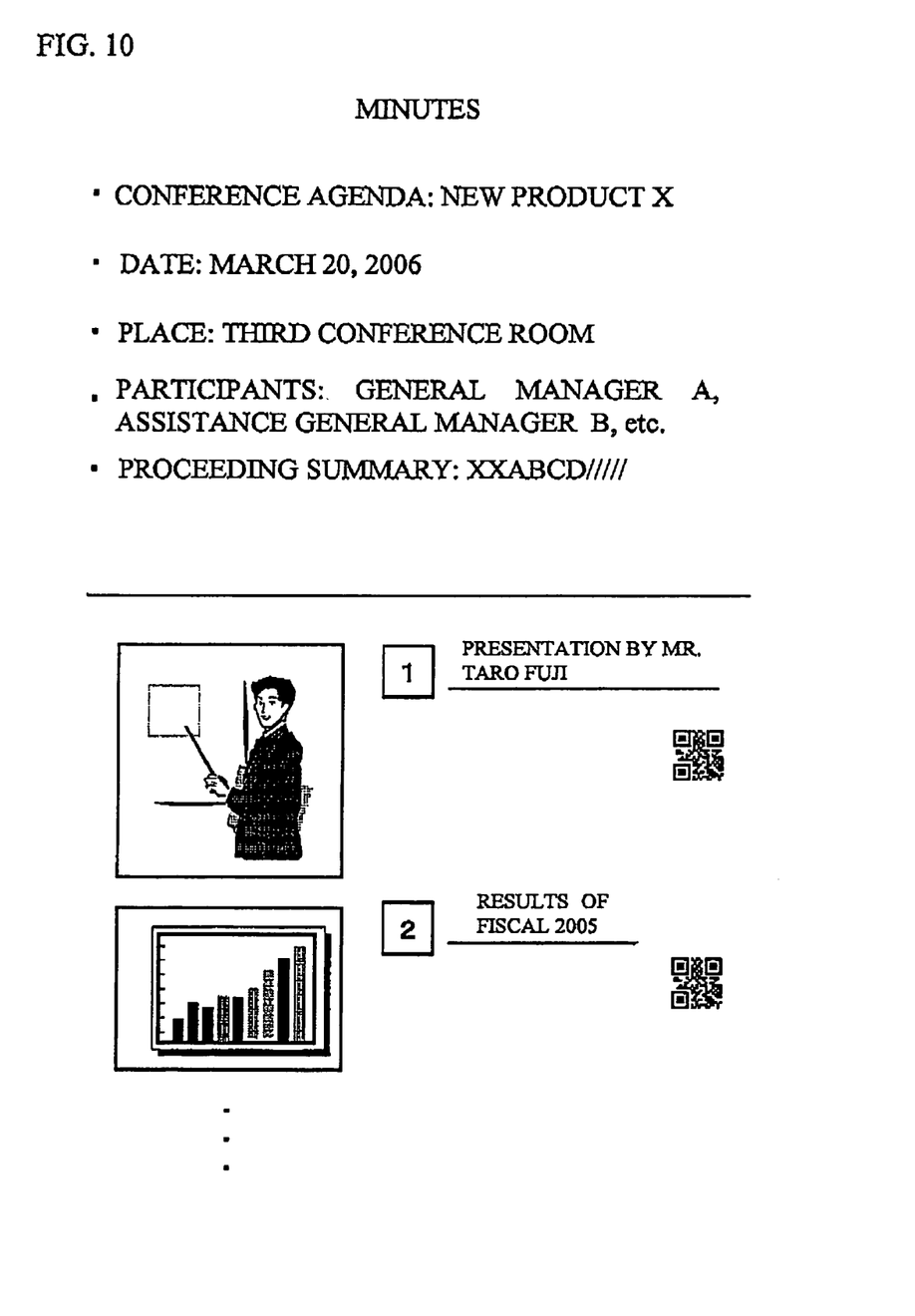
FIG. 10 is a view showing an example of the minutes data.

Otherwise, instead of the link, as shown in FIG. 10, an optically readable code such as a barcode and a QR code may be embedded in the minutes data. The access ID generated by the identifier generating portion 21 is included in the optically readable code. In the afore-mentioned case, a printed sheet of the minutes is sent by mail or transmitted by fax to the conference participant. The conference participant reads the optically readable code printed on the sheet by an optical reader, permitting an access to the data on the link destination.

The data management apparatus 30 has a data input/output apparatus 31, an identifier management portion 32, and a data acquiring portion 33. The data input/output apparatus 31 and the identifier management portion 32 serve as an identifying portion according to an aspect of the invention. The identifier management portion 32 also serves as a counting portion and as an access rejecting portion.

When the data input/output apparatus 31 receives an access from a user terminal device, the data input/output apparatus 31 extracts the access ID included in an access request from the terminal device. Such extracted access ID is sent to the identifier management portion 32. When the link attached to the minutes data is clicked (selected) by a user, the user terminal device transmits a remaining portion, after the server name is removed from the URL attached as a link destination, as a request command to the server apparatus 1 in accordance with HTTP protocols. When the data input/output apparatus 31 receives the access from the user terminal device, the data input/output apparatus 31 extracts a terminal identification ID of the terminal device and the access ID from the request command.

The identifier management portion 32 identifies the corresponding user with the access ID sent from the data input/output apparatus 31.

Figure 3C:
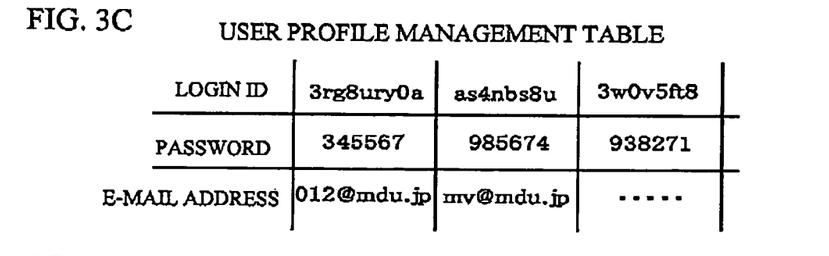

The identifier management portion 32 refers to the access control management table with the access ID, extracts the login ID of the accessing user and the conference session ID, and further extracts the password from a user profile management table shown in FIG. 3C. In the user profile management table, as shown in FIG. 3C, login IDs for logging in the system provided by the server apparatus 1, passwords, and e-mail addresses are registered and managed for every user. Since the access ID generated by the identifier generating portion 21 is unique, the login ID and the password can be identified with the access ID. When the identifier management portion 32 identifies the password and the login ID, the identifier management portion 32-makes the accessing user terminal device display an authentication screen so as to execute authentication via the data input/output apparatus 31.

When the user inputs the authorized password, the identifier management portion 32 notifies a successful authentication to the data acquiring portion 33, and notifies the conference session ID to the data acquiring portion 33.

Further, the identifier management portion 32 stores and manages the terminal identification ID acquired from the data input/output apparatus 31 in the database 40.

The data acquiring portion 33 extracts the conference content of the notified conference session ID from the database 40, and transmits the conference content to the user terminal device via the data input/output apparatus 31.

Figure 3D:
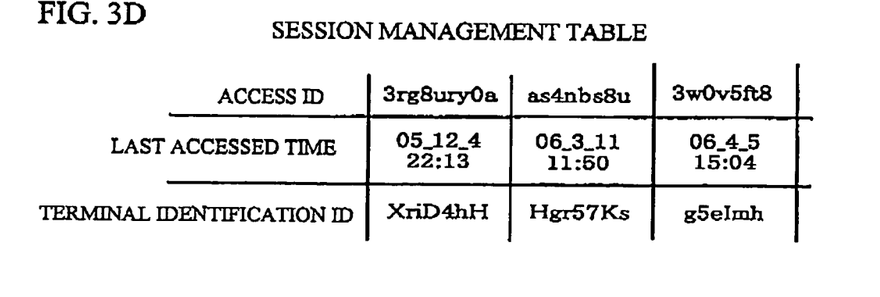

The database 40 includes a session management table shown in FIG. 3D in addition to the content management table shown in FIG. 3A, the access control management table shown in FIG. 3B, and the user profile management table shown in FIG. 3C. The session management table manages identification IDs of user terminal devices and time of day of the last access to a content in the system provided in the server apparatus 1.

Figure 4:
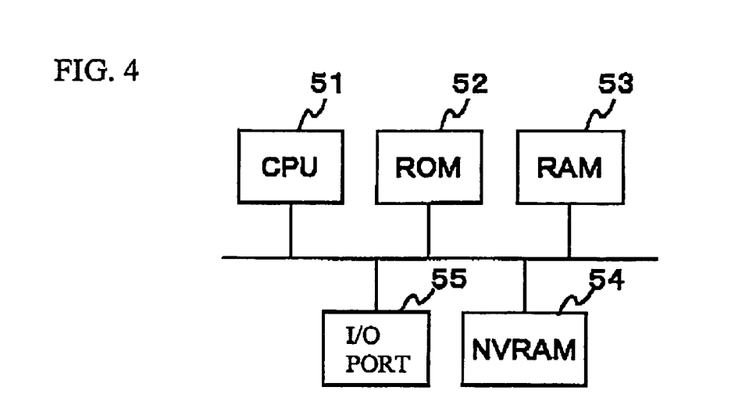
FIG. 4 is a diagram showing a structure of a control apparatus operated by software.

The data delivery apparatus 20 and the data management apparatus 30 shown in FIG. 1 may be performed by software control. FIG. 4 shows a structure of a control apparatus that enables the data delivery apparatus 20 and the data management apparatus 30 by means of the software control. A program stored in a Read Only Memory (ROM) 52 is read by a Central Processing Unit (CPU) 51, calculation in accordance with the program is executed by the CPU 51, and thereby the functions of the respective apparatuses may be performed. Procedure of the calculation by use of the CPU 51 will be described with reference to the after-mentioned flowcharts. Data of the calculation result is written in a Random Access Memory (RAM) 53. Data necessitating backup when the power is turned off is stored in a Non-Volatile RAM (NVRAM) 54.

In this exemplary embodiment, the link indicating the location of the conference content is attached to the minutes data summarizing the outline of the conference content, and the minutes data is transmitted to the user terminal device by e-mail. The unique access ID generated by the identifier generating portion 21 is included in the URL designating the link destination.

The server apparatus 1 manages the authentication information (password and login ID) to authenticate a user in association with the unique access ID. When accessed from the user terminal device, the server apparatus 1 extracts the access ID from the corresponding URL, and extracts the password and the login ID which are associated with the corresponding access ID from the database. Since the access ID of the transmitted URL is different for every user, the server apparatus 1 side can manage who accesses which content.

In addition, when the server apparatus 1 identifies the user with the use of the access ID, the server apparatus 1 makes the user terminal device display the authentication screen, and makes the user input the authentication information (password). In the successful authentication, the conference content is downloaded to the corresponding user terminal device.

Furthermore, to prevent an unauthorized access and abuse of an access, an issued URL becomes invalid when receiving accesses the predetermined limited number of times. For example, when the limited number of times is set to 1, accessing with the same URL (access ID) is authenticated only once.

Access authentication is valid until the identical terminal device logs out. Once there is no access from a user until a certain time passes, the server apparatus 1 automatically executes logout. At the time point of the logout, the number of accesses is counted as 1. The access ID can be reissued in accordance with a request from the user.

Expression 1 shows the number of access IDs that can be issued. Expression 2 shows the number of passwords that can be registered. Where the number of registered users is set to n, and authentication is performed with a combination of the access ID and the password, the violation probability of the authentication information of the access ID and the password becomes Expression 3. By authenticating only one-time access with the access ID notified to a user by e-mail, an enormously robust security functionality is obtainable, (Expression 1)

$$\text{The number of access IDs that can be issued: } \sum_{i=k}^{l} P_{62}^{i} \quad (1)$$

i = length of access ID
k = minimum length of access ID
l = maximum length of access ID
P = permutation (Expression 2)

$$\text{The number of passwords that can be issued: } \sum_{j=3}^{m} P_{62}^{j} \quad (2)$$

i = length of password
m = maximum length of password
P = permutation (Expression 3)

$$\frac{1}{n \times \sum_{i=k}^{l} P_{62}^{i} \times \sum_{j=3}^{m} P_{62}^{j}} \quad (3)$$

Figure 5:
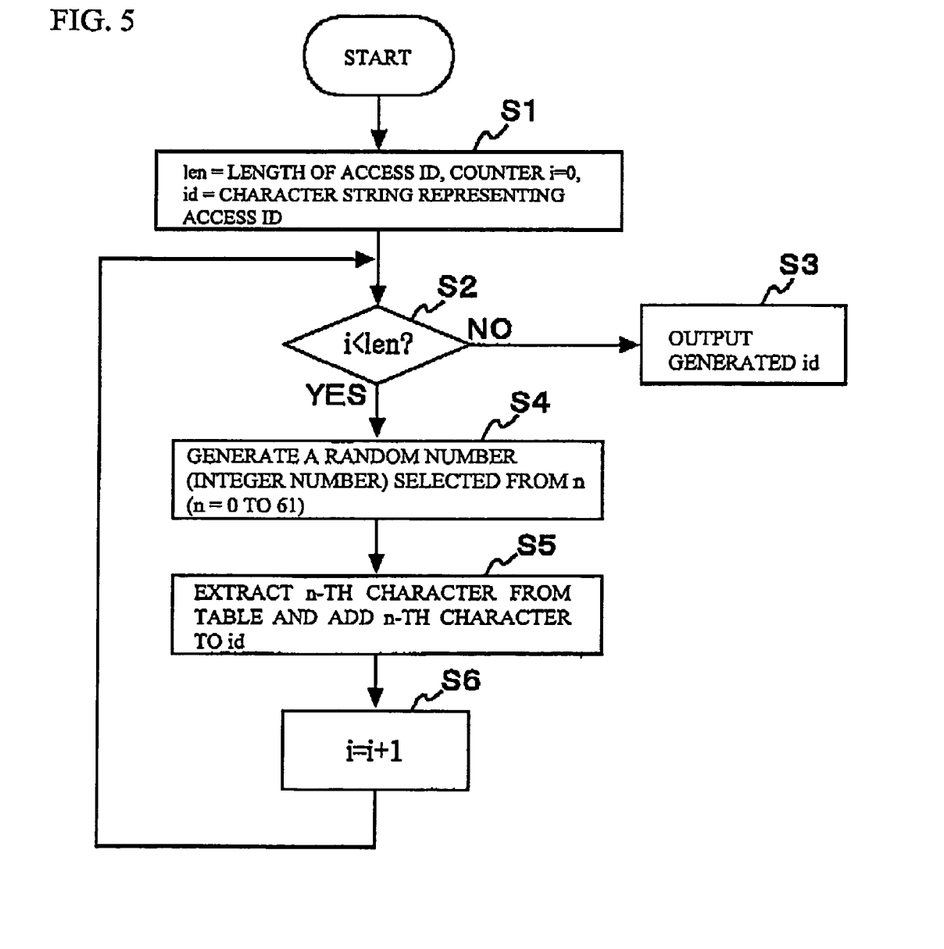
FIG. 5 is a flowchart showing a procedure of generating an access ID.

Next, a description will be given of a procedure of generating the access ID with reference to the flowchart shown in FIG. 5.

The identifier generating portion 21 generates the access ID to be included in the URL. The identifier generating portion 21 has an initial setting as follows. That is, the parameter representing the predetermined length of the access ID is set to len, and the counter i that counts the length of the access ID being generated is set to 0. id represents the character string of the access ID (step S1).

Figure 6:
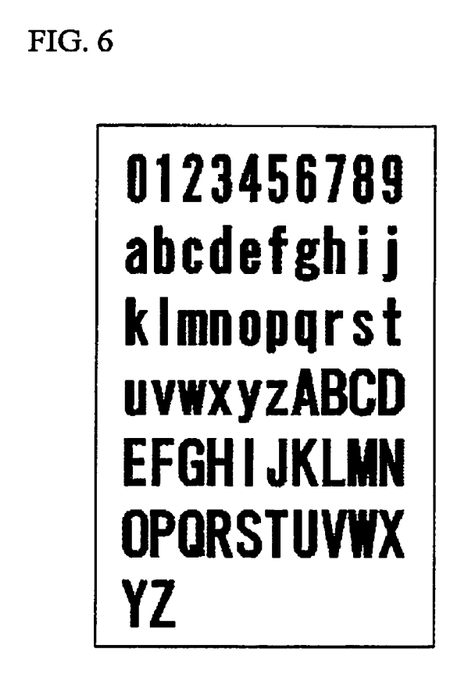
FIG. 6 is a view showing a character string used for the access ID.

Firstly, the identifier generating portion 21 compares the length of the access ID being generated i with the set length of the access ID len (step S2). When the count value of the counter i is smaller than len (step S2/YES), the identifier generating portion 21 generates a random number selected from n, n being 0 to 61 (step S4). In the identifier generating portion 21, characters corresponding to the numbers n are registered, n being 0 to 61. The identifier generating portion 21 extracts the n-th character corresponding to the generated random number from the table shown in FIG. 6, and adds the character to the access ID being generated, namely, id (step S5). Then, the value i is incremented by 1 (step S6). Such processing is repeated. When the length of the URL access ID being generated becomes equal to the predetermined length len (step S2/NO), the identifier generating portion 21 outputs the generated id as the access ID (step S3).

Figure 7:
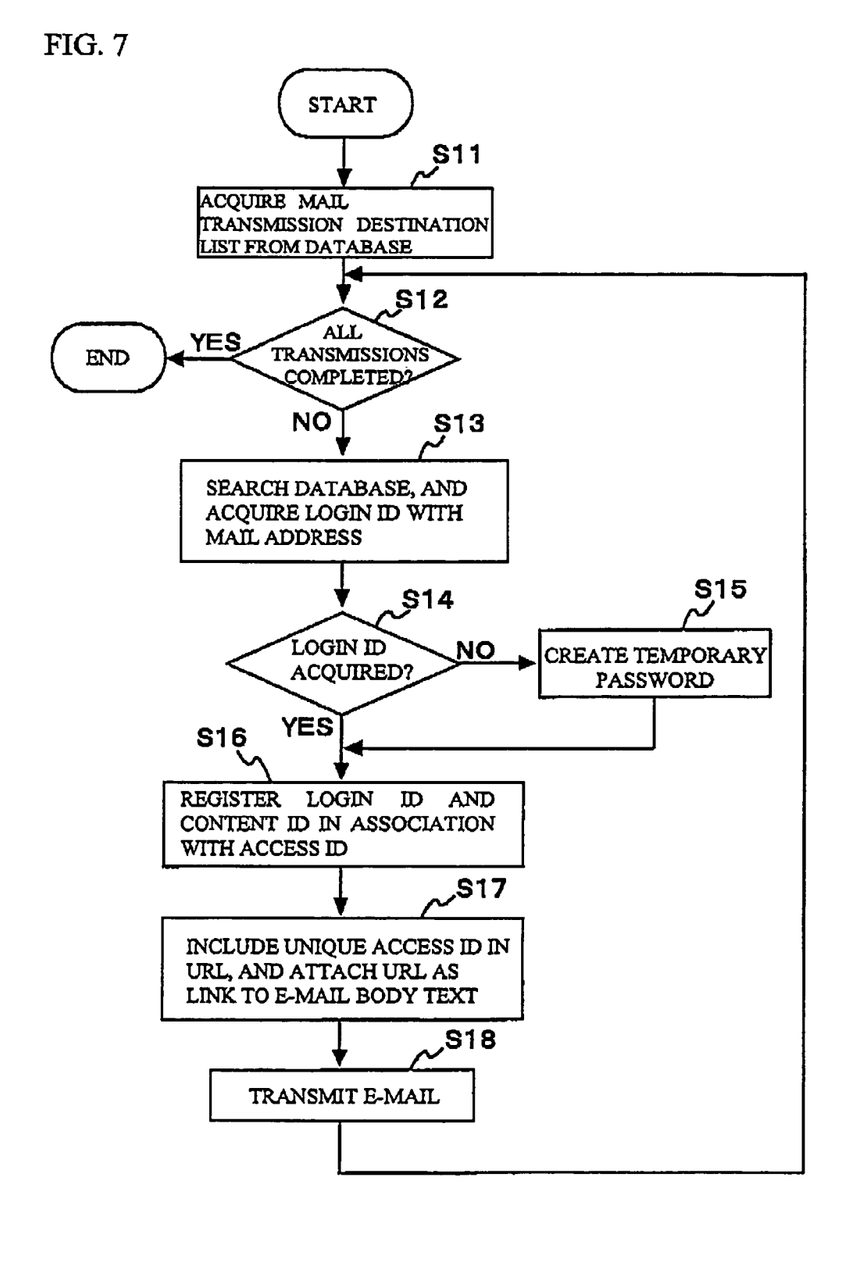
FIG. 7 is a flowchart showing a procedure of creating an e-mail including a URL indicating a location of a conference content.

Next, a description will be given of a process flow of embedding the URL including the generated access ID as a link into the body text of the e-mail and transmitting the e-mail to the corresponding user terminal device, with reference to the flowchart shown in FIG. 7.

Firstly, the mail generating portion 22 acquires a mail transmission destination list from the database 40 (step S11). In the content ID management table of the database 40, as shown in FIG. 3A, the transmission destination address to which the e-mail is sent is registered in association with the conference session ID.

The mail generating portion 22 extracts each transmission destination address one by one from the acquired destination list, and determines whether or not all the transmissions are completed (step S12). If not (step S12/NO), the mail generating portion 22 refers to the user profile management table by using the e-mail address as a search key, and acquires the login ID. In the user profile management table, as shown in FIG. 3C, the users' passwords and the e-mail addresses are registered in association with the login IDs.

When the mail generating portion 22 can acquire the login ID (step S14/YES), the mail generating portion 22 registers the login ID and the content ID in association with the access ID generated by the identifier generating portion 21 in the access control management table shown in FIG. 3B (step S16). Further, the mail generating portion 22 makes the URL indicating the location of the conference content include the access ID. Furthermore, the mail generating portion 22 attaches the link with the connection destination of the generated URL to the body text of the e-mail (step S17).

When the mail generating portion 22 is not able to acquire the login ID at step S14 (step S14/NO), the mail generating portion 22 generates a temporally usable password (step S15). The afore-mentioned password is notified from the administrator to a user. Thus, even if the user is not registered in the system provided by the server apparatus 1, the user is able to use the system by using such issued and notified temporary password.

Such generated e-mail is sent from the mail generating portion 22 to the mail delivery portion 23. Then, the generated e-mail is sent from the mail delivery portion 23 to the transmission destination (step S18). The foregoing processing is performed for the all e-mail addresses registered in the destination list. When the transmission of the e-mail having the unique access ID embedded therein to the all transmission destinations is completed (step S12/YES), processing is completed.

Figure 8:
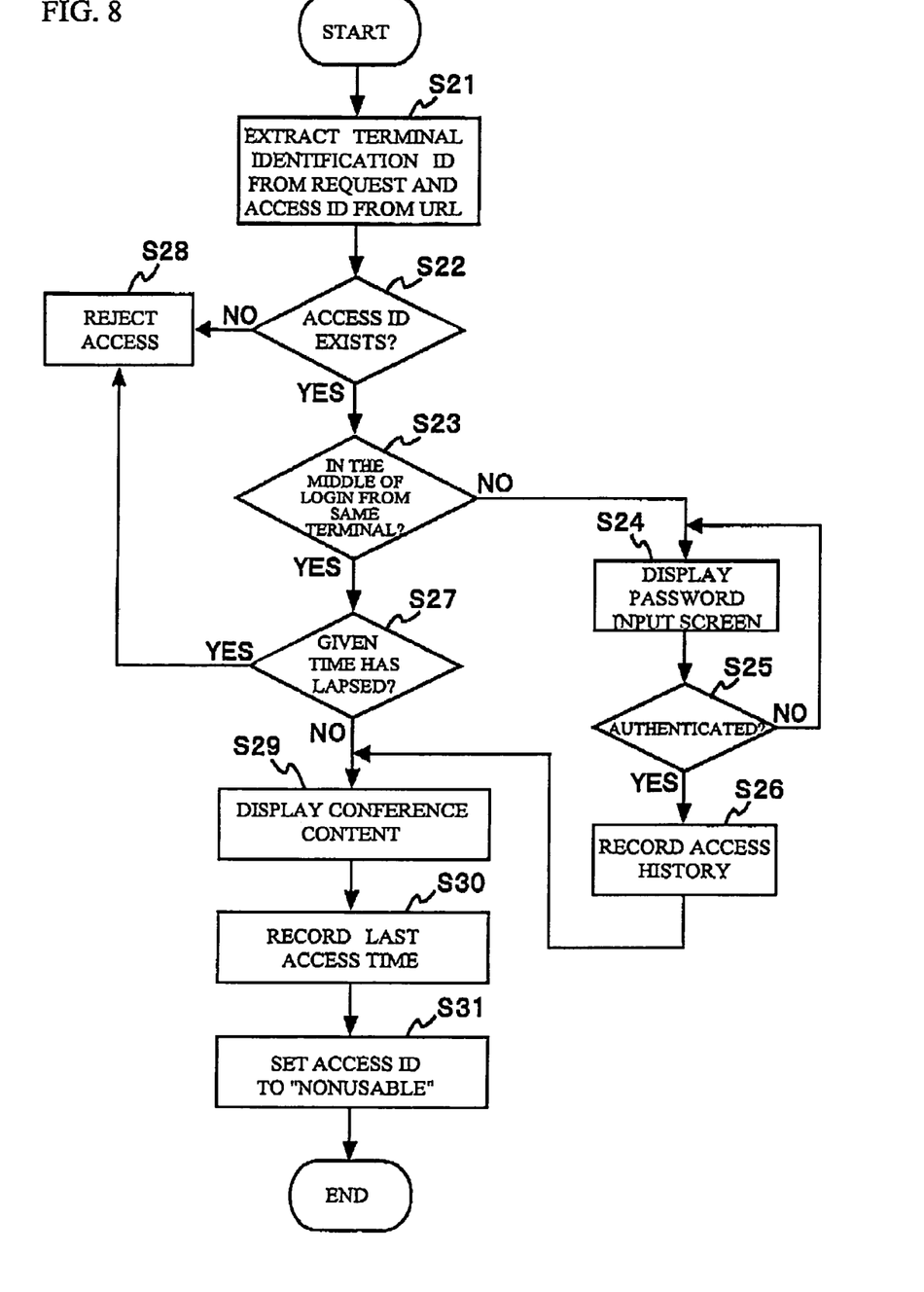
FIG. 8 is a flowchart showing a procedure of displaying the conference content by an access from a user terminal device.

Next, a description will be given of a procedure of the data management apparatus 30, with reference to the flowchart shown in FIG. 8.

When the data management apparatus 30 receives the access request from the user terminal device via the network, the data management apparatus 30 extracts the terminal identification ID and the access ID included in the access request from the user terminal device (step S21). Such extracted terminal identification ID and the access ID are sent to the identifier management portion 32. When the link attached to the minutes data is clicked (selected) by the user, the user terminal device transmits the remaining portion, after removing the server name from the URL attached as a link destination as a request command to the server apparatus 1 in accordance with HTTP protocols. When the data input/output apparatus 31 receives the access from the user terminal device, the data input/output apparatus 31 extracts the terminal identification ID of the corresponding terminal device and access ID from the request command (step S21).

The identifier management portion 32 identifies the corresponding user with the terminal identification ID and access ID sent from the data input/output apparatus 31. Firstly, when the data input/output apparatus 31 is not able to acquire the access ID (step S22/NO), the identifier management portion 32 rejects the access from the corresponding user terminal device (step S28). When the data input/output apparatus 31 can acquire the access ID (step S22/YES), the identifier management portion 32 refers to the access control management table with the access ID, extracts the login ID of the accessing user and the conference session ID, and further extracts the password from the user profile management table shown in FIG. 3C.

Figure 9:
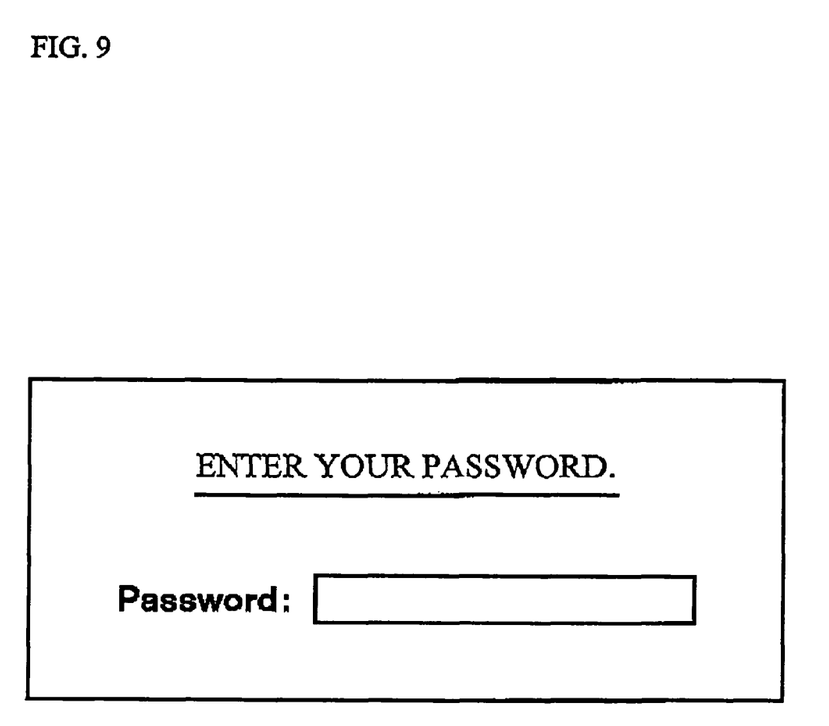
FIG. 9 is a view showing an example of an authentication screen to be displayed on the user terminal device.

The access ID generated by the identifier generating portion 21 is unique. Therefore, the login ID, the password, and the conference session ID can be identified with the access ID. When the password, the login ID, and the conference session ID are identified, the identifier management portion 32 further determines whether or not the user is being logged in (step S23). If not (step S23/NO), the identifier management portion 32 makes the user terminal device, which has sent the access request via the data input/output apparatus 31, display the authentication screen shown in FIG. 9 to execute authentication (step S25). When the authentication fails (step S25/NO), the identifier management portion 32 rejects the access from the corresponding user terminal device, and makes the user terminal device display the authentication screen (step S24).

When the authorized password is input by the user, the identifier management portion 32 records an access history (step S26), notifies the successful authentication to the data acquiring portion 33, and outputs the conference session ID to the data acquiring portion 33. When the data acquiring portion 33 acquires the conference session ID from the identifier management portion 32, the data acquiring portion 33 acquires the conference content registered with the acquired conference session ID, from the database 40. Then, the data acquiring portion 33 transmits the acquired conference content to the corresponding user terminal device via the data input/output apparatus 31, and makes the corresponding terminal device display the acquired conference content (step S29).

When the conference content is transmitted to the user terminal device, the identifier management portion 32 records the last access time of the corresponding user in the session management table shown in FIG. 3D (step S30). Further, the identifier management portion 32 sets the access ID used for accessing to "used" (step S31), and processing is completed.

When the identifier management portion 32 receives the access from the user terminal device being logged in (step S23/YES), the identifier management portion 32 determines whether or not a given time has already passed since the last operation input was made (step S27). If so (step S27/YES), the identifier management portion 32 rejects the access from the corresponding user terminal (step S28). However, if not (step S27/NO), the identifier management portion 32 notifies the corresponding state to the data acquiring portion 33, and the data acquiring portion 33 transmits the conference content to the corresponding user terminal device via the data input/output apparatus 31 and makes the corresponding data terminal device display the conference content (step S29).

In the process flow, when the access ID cannot be detected, the access from the corresponding user terminal device is rejected. However, it may be configured such that the authentication screen is displayed on the user terminal device to perform authentication, and in a successful authentication, the user is permitted to log onto the system.

A browsing management method employed as an aspect of the present invention is realized with a CPU, ROM, RAM, and the like, by installing a program from a portable memory device or a storage device such as a hard disc device, CD-ROM, DVD, or a flexible disc or downloading the program through a communications line. Then the steps of program are executed as the CPU operates the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A browsing management apparatus comprising:
a memory portion that stores a content used in a conference, an e-mail address of each participant who has participated in the conference and a password authenticating the each participant in association with each other;
a location information generating portion that generates a first URL by including an access ID generated to identify the each participant and identify that an acquisition request acquiring the content is from a participant in the conference into a second URL indicating a memory location of the memory portion that stores the content;
a controlling portion that (i) extracts the access ID included in the received acquisition request and determines whether the participant indicated by the access ID is already being logged in when the acquisition request requesting the content that designates the first URL recorded in a transmitted e-mail is received, (ii) transmits an input request of the password of the participant to the terminal device that outputs the acquisition request and performs a user authentication when not being logged in, (iii) transmits the requested content to the terminal device when the user authentication is successful, (iv) determines whether an elapsed time after being logged in has passed a given time when the participant indicated by the access ID is being logged in, and (v) blocks access with the terminal device that outputs the acquisition request and logs out when the given time has passed,
wherein the controlling portion rejects an another acquisition request requesting the content when the another acquisition request includes a same access ID, the same access ID containing identification information already transmitted in the acquisition request requesting the content to the terminal device, and
wherein the controlling portion counts a number of logout times to the first URL and rejects the access to the first URL when the number of the counted logout times reaches a predetermined effective number of times.

2. The browsing management apparatus according to claim 1, wherein the content includes at least one of an agenda, a date, a place, the participant of the conference, a proceeding summary of the conference, data of material displayed during the conference, written data associated with the material displayed during the conference, and sound data obtained by recording a statement in the conference.

3. The browsing management apparatus according to claim 1, further comprising a setting portion that sets the first URL for accessing to a nonusable state.

4. A browsing management apparatus comprising:
- a memory portion that stores a content used in a conference, an e-mail address of each participant who has participated in the conference and a password authenticating the each participant in association with each other;
- a location information generating portion that generates a first URL by including an access ID generated to identify the each participant and identify that an acquisition request acquiring the content is from a participant in the conference into a second URL indicating memory location of the memory portion that stores the content;
- a mail creating portion that creates an e-mail describing the first URL;
- a transmitting portion that transmits the e-mail to an e-mail address of the participant of the conference;
- a controlling portion that (i) extracts the access ID included in the received acquisition request and determines whether the participant indicated by the access ID is already being logged in when the acquisition request requesting the content that designates the first URL recorded in the transmitted e-mail is received, (ii) transmits an input request of the password of the participant to the terminal device that outputs the acquisition request and performs a user authentication when not being logged in, (iii) transmits the requested content to the terminal device when the user authentication is successful, (iv) determines whether an elapsed time after being logged in has passed a given time when the participant indicated by the access ID is being logged in, and (v) blocks access with the terminal device that outputs the acquisition request and logs out when the given time has passed,
- wherein the controlling portion rejects an another acquisition request requesting the content when the another acquisition request includes a same access ID, the same access ID containing identification information already transmitted in the acquisition request requesting the content to the terminal device, and
- wherein the controlling portion counts a number of logout times to the first URL and rejects the access to the first URL when the number of the counted logout times reaches a predetermined effective number of times.

5. The browsing management apparatus according to claim 4, wherein the memory portion stores terminal identification information, the conference participant identification information, and information to associate the terminal identification information with the conference participant identification information,
wherein:
- the identification information includes terminal identification information that identifies the terminal device used by the participant of the conference and conference participant identification information that identifies the participant of the conference;
- the location information generating portion generates the first URL that includes the terminal identification information in the first location information; and
- the browsing management apparatus further comprises an identifying portion extracts the terminal identification information from the first URL, and identifies the participant of the conference.

6. The browsing management apparatus according to claim 5, wherein:
- the conference participant identification information includes authentication information that authenticates the participant of the conference; and
- the identifying portion requests the terminal device to input the authentication information, and performs authentication by use of the authentication information.

7. The browsing management apparatus according to claim 5, further comprising:
- a management portion that stores a content ID and the conference participant identification information in association with each other in the memory portion, the content ID being added to the content that includes at least material data used in the conference and sound data obtained by recording a statement in the conference, and that manages the content that the participant of the conference can view and listen to; and
- a data delivery portion that delivers to the terminal device, the content that the participant of the conference can view and listen to, when the identifying portion identifies the participant of the conference.

8. The browsing management apparatus according to claim 4, wherein the email includes minutes data of the conference as a body text.

9. The browsing management apparatus according to claim 8, wherein the minutes data includes at least one of an agenda, a date, a place, the participant of the conference, a proceeding summary of the conference, a thumbnail image partially showing conference material, and a caption associated with the thumbnail image.

10. The browsing management apparatus according to claim 4, wherein the content includes at least one of an agenda, a date, a place, the participant of the conference, a proceeding summary of the conference, data of material displayed during the conference, written data associated with the material displayed during the conference, and sound data obtained by recording a statement in the conference.

11. A browsing management method comprising:
- storing a content used in a conference, an e-mail address of each participant who has participated in the conference and a password authenticating the each participant in association with each other;
- generating a first URL by including an access ID generated to identify the each participant and identifying that an acquisition request acquiring the content is from a participant in the conference into a second URL indicating a memory location of the memory portion that stores the content;
- extracting the access ID included in the received acquisition request and determining whether the participant indicated by the access ID is already being logged in when the acquisition request requesting the content that designates the first URL recorded in the transmitted e-mail is received;
- transmitting an input request of the password of the participant to the terminal device that outputs the acquisition request and performing a user authentication when not being logged in;
- transmitting the requested content to the terminal device when the user authentication is successful;
- determining whether an elapsed time after being logged in has passed a given time when the participant indicated by the access ID is being logged in;
- blocking access with the terminal device that outputs the acquisition request and logs out when the given time has passed;
- rejecting an another acquisition request requesting the content when the another acquisition request includes a same access ID, the same access ID containing identification information already transmitted in the acquisition request requesting the content to the terminal device; and counting a number of logout times to the first URL and rejecting the access to the first URL when the number of the counted logout times reaches a predetermined effective number of times.

12. The browsing management method according to claim 11, wherein the content includes at least one of an agenda, a date, a place, the participant of the conference, a proceeding summary of the conference, data of material displayed during the conference, written data associated with the material displayed during the conference, and sound data obtained by recording a statement in the conference.

13. A non-transitory computer readable medium storing a program causing a computer to execute a process for browsing management, the process comprising:

storing a content used in a conference, an e-mail address of each participant who has participated in the conference and a password authenticating the each participant in association with each other;

generating a first URL by including an access ID generated to identify the each participant and identifying that an acquisition request acquiring the content is from a participant in the conference into a second URL indicating a memory location of the memory portion that stores the content;

extracting the access ID included in the received acquisition request and determining whether the participant indicated by the access ID is already being logged in when the acquisition request requesting the content that designates the first URL recorded in the transmitted e-mail is received;

transmitting an input request of the password of the participant to the terminal device that outputs the acquisition request a user authentication when not being logged in;

transmitting the requested content to the terminal device when the user authentication is successful;

determining whether an elapsed time after being logged in has passed a given time when the participant indicated by the access ID is being logged in;

blocking access with the terminal device that outputs the acquisition request and logs out when the given time has passed;

rejecting an another acquisition request requesting the content when the another acquisition request includes a same access ID, the same access ID containing identification information already transmitted in the acquisition request requesting the content to the terminal device; and counting a number of logout times to the first URL and rejecting the access to the first URL when the number of the counted logout times reaches a predetermined effective number of times.

14. The non-transitory computer readable medium storing a program causing a computer to execute a process for browsing management according to claim 13, wherein the content includes at least one of an agenda, a date, a place, the participant of the conference, a proceeding summary of the conference, data of material displayed during the conference, written data associated with the material displayed during the conference, and sound data obtained by recording a statement in the conference.

15. A browsing management apparatus comprising:

a memory portion that stores a content used in a conference, an e-mail address of each participant who has participated in the conference and a password authenticating the each participant in association with each other;

a location information generating portion that generates a first URL by including an access ID generated to identify the each participant and identify that an acquisition request acquiring the content is from a participant in the conference into a second URL indicating a memory location of the memory portion that stores the content;

a notification creating portion that creates an notification in which the first URL is embedded;

a transmitting portion that transmits the notification to the participant of the conference;

an identifying portion that receives an access designating the first URL from a terminal device via a network, and then extracts the identification information from the first URL to identify the participant of the conference;

a controlling portion that (i) extracts the access ID included in the received acquisition request and determines whether the participant indicated by the access ID is already being logged in when the acquisition request requesting the content that designates the first URL recorded in the transmitted notification is received, (ii) transmits an input request of the password of the participant to the terminal device that outputs the acquisition request and performs a user authentication when not being logged in, (iii) transmits the requested content to the terminal device when the user authentication is successful, (iv) determines whether an elapsed time after being logged in has passed a given time when the participant indicated by the access ID is being logged in, and (v) blocks access with the terminal device that outputs the acquisition request and logs out when the given time has passed, wherein the controlling portion rejects an another acquisition request requesting the content when the another acquisition request includes a same access ID, the same access ID containing identification information already transmitted in the acquisition request requesting the content to the terminal device, and wherein the controlling portion counts a number of logout times to the first URL and rejects the access to the first URL when the number of the counted logout times reaches a predetermined effective number of times, wherein the identifying portion identifies the participant of the conference by extracting authentication information associated with the identification information from a database and authenticating the participant of the conference based on the authentication information.

16. The browsing management apparatus according to claim 15, wherein the content includes at least one of an agenda, a date, a place, the participant of the conference, a proceeding summary of the conference, data of material displayed during the conference, written data associated with the material displayed during the conference, and sound data obtained by recording a statement in the conference.

* * * * *